United States Patent [19]

Fisher et al.

[11] 4,287,650

[45] Sep. 8, 1981

[54] UNIVERSAL JOINT OUTER MEMBER

[75] Inventors: Leslie G. Fisher, Birmingham, England; John S. Waite, Welshpool, Wales

[73] Assignee: GKN Transmissions Limited, Birmingham, England

[21] Appl. No.: 87,281

[22] Filed: Oct. 22, 1979

[30] Foreign Application Priority Data

Nov. 1, 1978 [GB] United Kingdom ............... 42782/78

[51] Int. Cl.³ ............................................ B21D 53/12
[52] U.S. Cl. ........................ 29/148.4 R; 29/149.5 R; 29/505; 29/515
[58] Field of Search .................. 29/148.4 R, 505, 515, 29/149.5 R, 149.5 C, 149.5 DP

[56] References Cited

U.S. PATENT DOCUMENTS 1,174,942 3/1916 Bache ............................. 29/149.5 R
2,636,254 4/1953 Gunning ......................... 29/149.5 R Primary Examiner—James L. Jones, Jr.
Attorney, Agent, or Firm—Merriam, Marshall & Bicknell

[57] ABSTRACT

A method of making a universal joint outer member affording a cavity with axially extending grooves in the wall thereof for receiving torque transmitting balls, comprising fitting into a preformed outer member, of light weight material, one or more wear resistant elements which define the grooves, and subjecting the assembly to an extrusion operation to secure the groove-defining elements in position and form the outer member to size.

4 Claims, 3 Drawing Figures

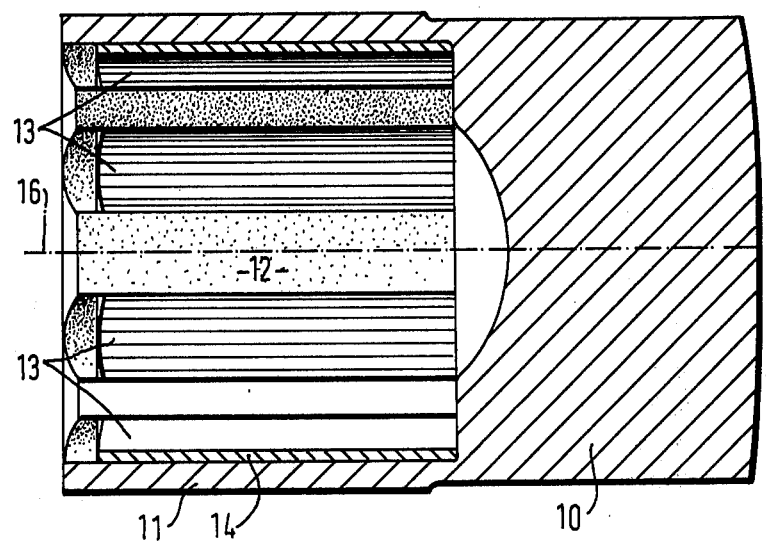
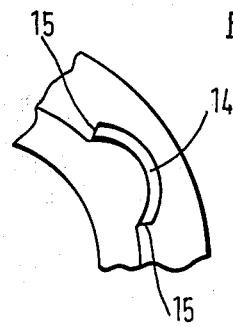

UNIVERSAL JOINT OUTER MEMBER

BACKGROUND TO THE INVENTION

Field of the Invention

This invention relates to universal joints, for torque transmission, of the type comprising an outer member affording a cavity within which is disposed an inner joint member, the outer and inner joint members having axially extending opposed pairs of grooves in each of which pairs of grooves is received a torque transmitting element such as a ball to provide for torque transmission between the outer and inner joint members whilst accommodating relative angular displacement between the rotational axes thereof. More particularly, the invention relates to a method of making an outer member of such a joint.

The generally accepted construction for an outer member of such a joint is an all-steel cup-like component, with relatively thick walls. This is usually manufactured from a blank resulting from a forging or extrusion process, the manufacturing involving machining processes to produce the finished article of the required dimensions. However, such an outer member is relatively heavy, and weight reduction is assuming increasing importance in components intended for use in motor vehicles. It is the object of the present invention to provide a joint outer member which is of relatively light weight.

SUMMARY OF THE INVENTION

According to the invention, we provide a method of making a universal joint outer member, affording a cavity with axially extending grooves in the wall thereof for receiving balls for torque transmission, comprising providing an element or elements affording groove-defining surfaces, providing an outer member affording a cavity formed to receive said groove-defining element or elements and of a relatively light weight material permanently deformable by extrusion, introducing said groove-defining element or elements into said outer member, introducing into said outer member a former for determining the final positions of the grooves and dimensions of the cavity, and subjecting this assembly to an extrusion process to form the outer member to the required size and to secure the groove-defining element or elements therein.

In the case where there is provided a plurality of groove-defining elements, each of these may comprise a steel component of arcuate cross-sectional shape, formed, e.g., as a pressing. Alternatively, a single groove-defining element may take the form of a steel cup of which the interior side wall is formed with the grooves.

Each individual groove-defining element is preferably of a cross-sectional shape to interfit with the outer member so as to be held in receiving formations therein against displacement therefrom, other than an axial sliding movement (by which the groove-defining element has been inserted).

When a universal joint outer member is made according to the method of the present invention, a weight saving is achieved because only the part or parts affording the grooves which actually contact the balls for torque transmission are of the relatively heavy material possessing the necessary wear-resisting properties, and the remainder of the joint outer member is of light weight material (usually a suitable aluminium alloy). In addition to this, if the groove-defining element or elements are made to the necessary dimensional accuracy, they can be located relative to the light weight part of the outer member sufficiently accurately to mean that no or a minimum of maching of the grooves of the joint outer member is necessary subsequent to removal of the former therefrom after the extrusion operation.

BRIEF DESCRIPTION OF THE DRAWINGS

The invention will now be described by way of example with reference to the accompanying drawings, of which, FIG. 2 is a longitudinal cross-section of the joint outer member, FIG. 3 is an end view of one of the grooves of the completed outer member.

DESCRIPTION OF THE PREFERRED EMBODIMENTS

Figure 1:
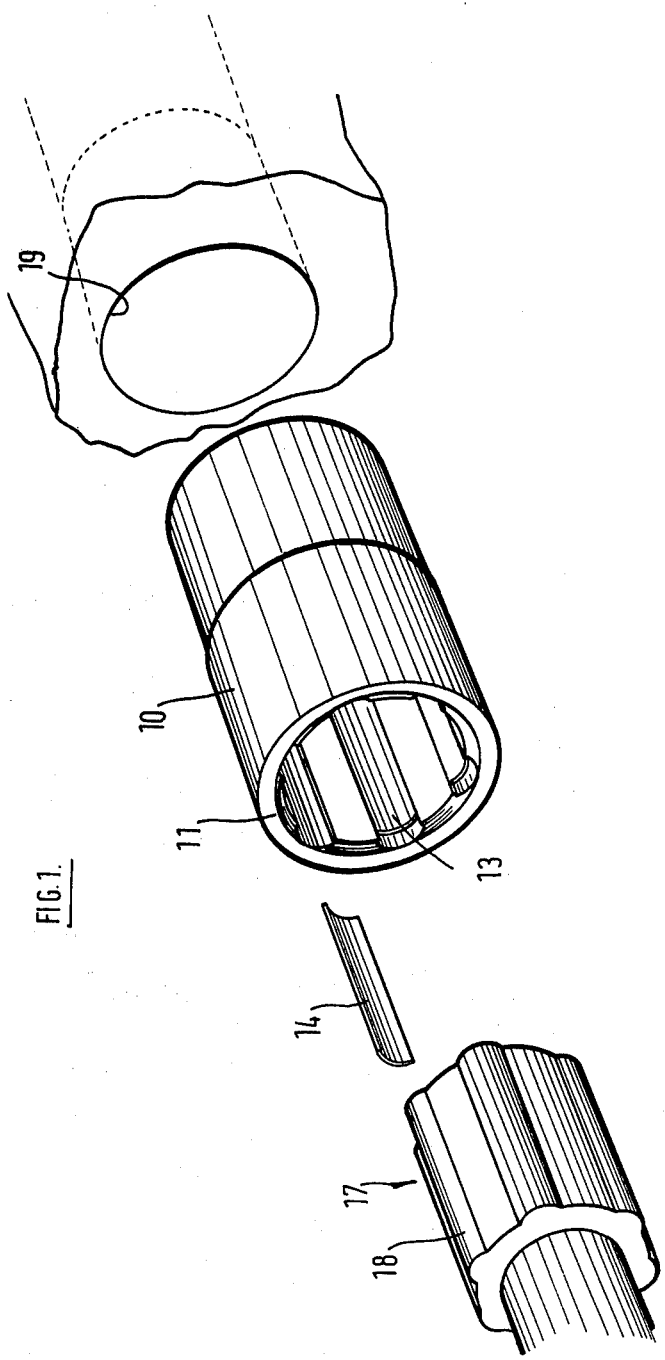
FIG. 1 is a perspective view illustrating the manner in which a joint outer member is manufactured in accordance with the invention.

The universal joint outer member shown in the drawings comprises a component 10 made of an aluminium alloy, with a solid base portion and a somewhat cylindrical portion 11 which defines an internal cavity 12 the side wall of which cavity has axially extending grooves 13 for accommodating balls for the torque transmission with an inner joint member, not shown. The grooves 13 are actually defined by individual steel inserts 14, of arcuate cross-sectional shape, held within the portion 11 of the component 10.

In manufacture of the joint outer member according to the method of the invention, the aluminium alloy component 10 is made from a blank or slug of material by a back extrusion process, i.e., by applying to the slug in a closed die a punch tool having a profile corresponding to that required for the interior of the cylindrical portion 11. Subsequently the component 10 is subjected to any necessary heat treatment. The inserts 14 which define the grooves are manufactured separately, e.g., as pressings from steel strip.

The inserts 14 are then assembled with the component 10 by axial sliding into the latter. The inserts 14 have edges 15 which are convergent towards the rotational axis (16) of the joint outer member, and the parts of the component 10 into which the inserts 14 fit are of the same shape, to provide a "dovetail" effect and hold the inserts in position against everything other than the axial sliding displacement by which they are assembled.

A former or mandrel 17 having lands 18 corresponding to the desired final shape and size of the groove in the outer joint member is then introduced into the cavity 12 of the assembly. This assembly is then subjected to a process of extrusion or "ironing" by being forced axially through an aperture 19 of a die. This process effects a reduction in the outside diameter of the outer joint member, and ensures that the inserts 14 defining the grooves are correctly located and firmly held in the outer joint member. The inserts 14 are held by friction and by the "ironing" process causing some flow of material over the outermost end faces of the inserts.

By way of example, the "ironing" process which secures the groove-defining inserts in position may cause approximately 20% reduction in the axially presented surface area of the joint outer member.

In possible modifications of the method, the groove defining insert elements may be replaced by a single cup-like element which affords all the grooves of the joint member, but which is retained in position in aluminium alloy member in the same manner as described above in relation to individual groove-defining elements. Securement of the groove-defining element or elements in position in the aluminium alloy member by extrusion renders it unlikely that the groove-defining element or elements will work loose in service and lead to failure of the universal joint from this source.

In yet another alternative the grooves may be defined by a single element formed from, e.g. metal, strip and bent to a generally cylindrical shape to provide all the grooves. In this construction, the abuttig edges of the element need not be joined together, since the securement of the element in the aluminium component makes the element retain its shape.

Because the groove-defining element and the light weight component in which they fit are manufactured separately, they can be separately subjected to whatever forms of heat treatment or other treatment are necessary to impart the required properties, without risk of distortion or other undesirable effects which could arise if the components are treated after assembly.

We claim:

1. A method of making a universal joint outer member affording a cavity with axially extending grooves in the wall thereof for receiving balls for torque transmission, comprising the steps of providing at least one element affording groove-defining surfaces, providing an outer member affording a cavity shaped to receive said at least one groove-defining element and of a relatively light weight material permanently deformable by extrusion, introducing said at least one groove-defining element into said outer member, introducing into said outer member a former for determining the final positions of the grooves and dimensions of the cavity, and subjecting this assembly to an extrusion process to form the outer member to the required size and to secure said at least one groove-defining element therein.

2. A method according to claim 1, further comprising providing a plurality of elements affording groove-defining surfaces, each such element comprising a pressed steel component of arcuate cross-sectional shape.

3. A method according to claim 2 further comprising introducing said elements axially into said outer member, each of said elements having a cross-sectional shape which interfits with said member so as to be held in an undercut receiving formation therein against displacements there from other than axially sliding movement.

4. A method according to any one of claims 1 to 3, wherein said outer member is made of an aluminium alloy.

* * * * *